United States Patent [19]
Ferez

[11] Patent Number: 6,086,078
[45] Date of Patent: Jul. 11, 2000

[54] ROWING MACHINE WITH WHEELS

[76] Inventor: Marcio C. Ferez, 777 E. 25 St., Suite 206, Hialeah, Fla. 33013

[21] Appl. No.: 08/959,044

[22] Filed: Oct. 28, 1997

[51] Int. Cl.[7] ....................................... B62M 1/16
[52] U.S. Cl. ............................ 280/256; 280/247
[58] Field of Search .............. 280/242.1, 226.1, 280/225, 246, 293, 233, 231, 267, 282, 263, 56, 247

[56] References Cited

U.S. PATENT DOCUMENTS

| | | | |
|---|---|---|---|
| 1,479,887 | 1/1924 | Bitner | 280/269 |
| 1,503,832 | 8/1924 | Hubbard | 280/269 |
| 2,207,161 | 7/1940 | Roe | 280/269 |
| 3,645,558 | 2/1972 | McMullen | 280/270 |
| 3,895,825 | 7/1975 | Sink | 280/234 |
| 4,903,857 | 2/1990 | Klopfenstein | 280/267 |
| 5,069,469 | 12/1991 | Rodengrant et al. | 280/288.1 |
| 5,284,355 | 2/1994 | Ishii | 280/287 |
| 5,492,349 | 2/1996 | Ferez . | |
| 5,536,029 | 7/1996 | Gramckow | 280/263 |

Primary Examiner—Kevin Hurley
Assistant Examiner—Andrew J. Fischer
Attorney, Agent, or Firm—J. Sanchelima

[57] ABSTRACT

A rowing machine with a body frame assembly and actuated by a seated user. It includes a stabilizing wheel assembly with the ends of a pivotally mounted axle provided with wheels. A pivotally mounted front wheel assembly is designed for steering the machine and a rotably mounting rear wheel for supporting the bulk of the user's weight as it is transmitted the seat assembly to the frame of the machine and to the rear wheel. The steering mechanism includes a novel steering linkage rod connecting the fork supporting the front wheel and the pivotally mounted axle where the stabilizing wheel assembly is rotably mounted. The approximate distance from the pivoting axis of the front wheel to the point on which one end of the steering linkage is pivotally mounted corresponds to 3 inches. The length of the steering linkage rod is approximately 27 and 5/16 inches. The distance from the pivoting axis of the axle to which the stabilizing wheels are mounted to the point where the other end of the steering linkage is connected is 4 and 3/4 inches. These measurements have found to provide the optimum results and minor variations are contemplated to give substantially the same results, specially when the measurements are proportionally increased or decreased maintaining the same relationships.

2 Claims, 2 Drawing Sheets

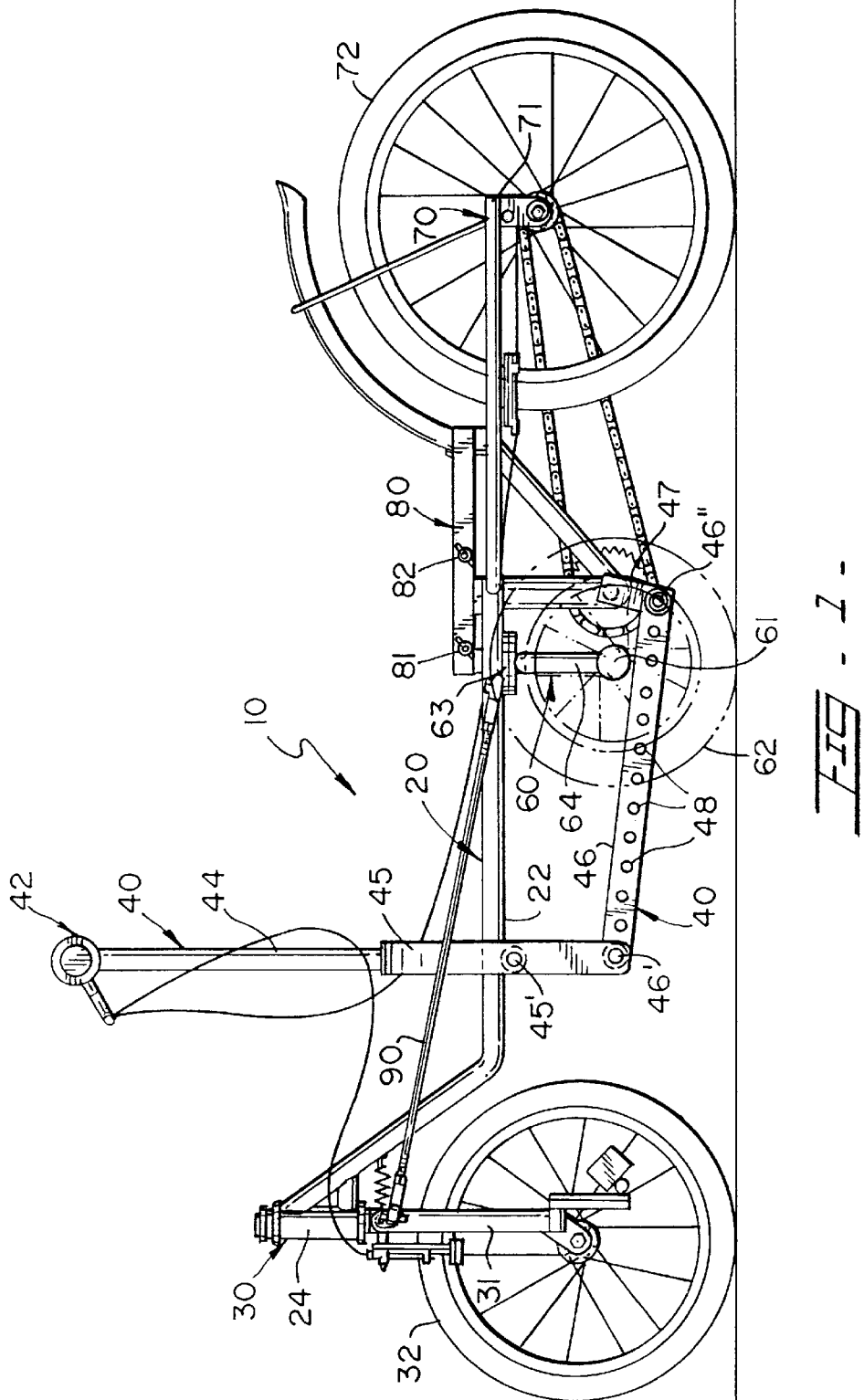
FIG - 1 -

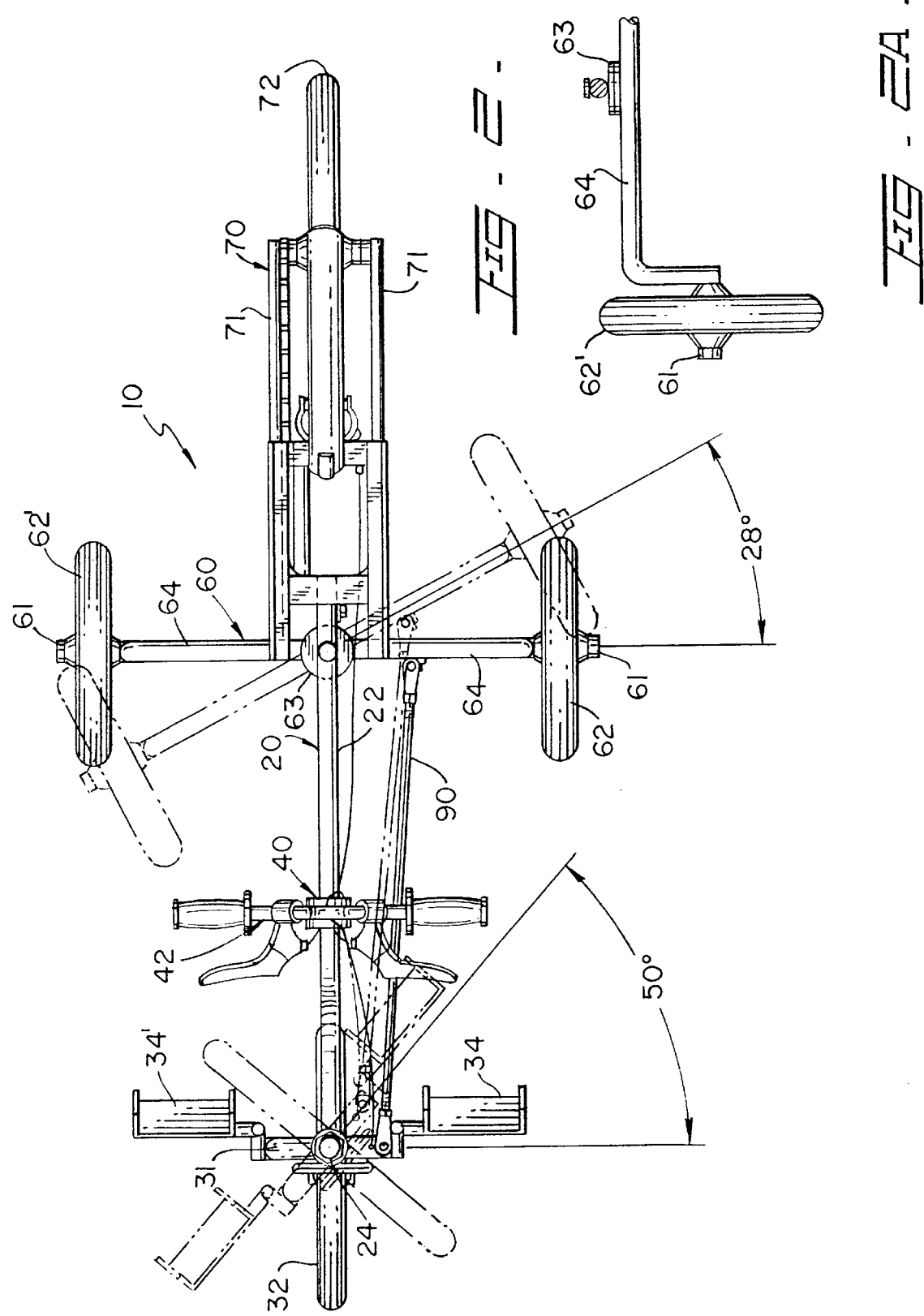

ROWING MACHINE WITH WHEELS

BACKGROUND OF THE INVENTION

1. Field of the Invention.

The present invention relates to a rowing machine with wheels, and more particularly, to the type that is self-propelled.

2. Description of the Related Art.

Applicant believes that the closest reference corresponds to U.S. Pat. No. 5,492,349 issued to the applicant herein. However, it differs from the present invention because it does not have the novel steering mechanism we have in the present invention. Also, the patented device requires the use of two rear wheels which makes the device more expensive and dangerous. The danger comes from the probability of a user reaching accidentally the wheels with his hands. The present invention achieves more stability with the stabilizing wheel assembly that is positioned right below the user with the consequent lowering of the center of gravity. For rowing machines the stability is more important than in bicycles because the entire body of the user is at motion. With bicycles a user uses mostly his lower extremities.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a rowing machine that includes a novel steering linkage mechanism.

It is another object of this invention to provide a rowing machine that does not require the driver to use his upper extremities to steer the device.

It is another object of this invention to provide a rowing machine that operates in both forward and reverse directions.

It is still another object of the present invention to provide a rowing machine that permits a user to exercise his/her muscle while he/she is in motion.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is an elevational side view of the present invention.

FIG. 2 is a top view of this invention showing the relation of the angles of the rotation of the wheels and the steering linkage rod.

FIG. 2A is a partial elevational view of the stabilizing wheels assembly.

DETAILED DESCRIPTION OF THE PREFERRED EMBODIMENT

Referring now to the drawings, where the present invention is generally referred to with numeral 10, it can be observed that it basically includes frame body assembly 20, linking fork supporting front wheel assembly 30, rowing propulsion assembly 40, stabilizing wheels assembly 60 and fork supporting rear wheel assembly 70.

As seen in FIGS. 1 and 2, rowing machine 10 is supported on a horizontal surface and displaced by front wheel 32, stabilizing wheels 62 and 62', and rear wheel 72. Rowing machine 10 moves when a seated user actuates steering handle member 42 of rowing propulsion assembly 40 back and forth.

Rowing propulsion assembly 40, as shown in FIG. 2, comprises steering handle member 42 perpendicularly mounted on the uppermost end of tubular member 44, connecting pivoting member 45 and linkage bar 46. Connecting pivoting member 45 permits tubular member 44 and steering handle member 42 to pivot about pivoting pin 45' towards and forwards a user. Pivoting pin 45' is in turn mounted to the structure of tube 22 of frame assembly 20. Linkage bar 46 is pivotally mounted, at one end, to the distal end of connecting pivoting member 45 by pin 46' and to connecting member 47 at the other end by pin 46", as best seen in FIG. 1. Linkage bar 46, in the preferred embodiment, includes openings 48 which are included to reduce weight.

Fork supporting assembly 30 has fork member 31 pivotally mounted to member 24 of frame assembly 20. Fork member 31 supports front wheel 32 and pedal members 34 and 34', as best seen in FIG. 2. Pedal members 34 and 34' are located at a space apart relationship with respect to each other and with wheel 32 inbetween. Pedal members 34 and 34' permit a user to drive front wheel 32 thereby steering rowing machine 10 in a determined direction.

Stabilizing wheels assembly 60, in the preferred embodiment, includes axles 61 with stabilizing wheels 62 and 62' mounted to their ends. Axles 61 are rigidly mounted to the ends of axle connecting member 64. Axle connecting member 64 is pivotally mounted to the underside of tube 22 of frame body assembly 20 through pivoting plates assembly 63. Assembly 63 includes two lubricated abutting plates. Axle connecting member 64, and thus wheels 62 and 62', pivot by the actuation of pedal members 34 and 34', and linkage rod 90. Axle connecting member 64 is connected to fork member 31 through steering linkage rod 90 so that when a user actuates pedal members 34 and 34', front wheel 32 pivots forcing stabilizing wheels 62 and 62' to pivot in the same direction. As indicated in FIG. 2, the maximum angle of pivot for front wheel 32 is 50 degrees while for stabilizing wheels 62 and 62' is 28 degrees.

The distance from the pivoting axis of front wheel 32 to the point, perpendicularly extending therefrom, on which one end of the steering linkage rod 90 is pivotally mounted corresponds to 3 inches. The length of the steering linkage rod 90 is 27 and 5/16 inches. The distance from the pivoting axis of axle connecting member 64 to the point where the other end of the steering linkage rod 90 is connected is 4 and 3/4 inches. In the preferred embodiment, steering linkage rod 90 is positioned at a substantial parallel relationship with respect to tube 22 with an approximate preferable angle of 3.8 degrees with respect to the longitudinal plane of said frame body assembly 20. It has been found that good results are obtained with angles that go from 3 degrees to 5 degrees. These measurements have found to provide the optimum results and minor variations are contemplated to give substantially the same results, specially when the measurements are proportionally increased or decreased maintaining the same relationships.

Fork supporting rear wheel assembly 70 includes fork member 71 that rotatably supports rear wheel 72. Rear wheel 72 supports the bulk of the user's weight with assembly 60 as it is transmitted from seat assembly 80 through frame body assembly 20 of rowing machine 10 to rear wheel 72. The center of gravity achieved is the lowest possible with utmost stability. A seat member (not shown) of seat assembly 80 can be longitudinally adjusted with butterfly members 81 and 82, as seen in FIG. 1.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. In a vehicle having a frame body assembly that includes a rowing propulsion mechanism, a seat, a rear wheel rotably mounted to said frame body assembly, front wheel assembly including a fork assembly centrally and pivotally mounted to said frame body assembly, the improvement comprising:

A) a stabilizing wheel assembly having an axle connecting member pivotally mounted to said frame body assembly and including two ends having each an axle having rotably mounted wheels thereon; and B) a linkage rod having first and second ends, said first end being pivotally mounted to said fork assembly at a position off the pivoting point of said fork assembly and said second end being pivotally mounted to said axle connecting member at a position away from the pivoting point of said axle connecting member on said body frame assembly and the angle of said linkage rod with respect to said frame body assembly is between 3 and 5 degrees.

2. The improvement set forth in claim 1 wherein said position of the pivoting point on said fork assembly is three inches from the center of said fork assembly, said position away from the pivoting point of said axle connecting member is 4 and ¾ inches and the distance between said first and second pivotally connected ends of said linkage rod is 27 and 5/16 inches.

* * * * *